US010288129B2

(12) United States Patent
Long et al.

(10) Patent No.: US 10,288,129 B2
(45) Date of Patent: May 14, 2019

(54) FLUID CONTROL ARRANGEMENT FOR DISK PACKS (71) Applicant: Deere & Company, Moline, IL (US)

(72) Inventors: Randall Long, Coffeyville, KS (US); William G. Detrick, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 197 days.

(21) Appl. No.: 15/249,983

(22) Filed: Aug. 29, 2016

(65) Prior Publication Data
US 2018/0058513 A1   Mar. 1, 2018

(51) Int. Cl.
F16D 13/74     (2006.01)
F16D 13/72     (2006.01)
F16D 65/18     (2006.01)
F16D 65/78     (2006.01)
F16D 25/0638   (2006.01)
F16D 55/24     (2006.01)
F16D 21/04     (2006.01)
F16D 55/40     (2006.01)
(Continued)

(52) U.S. Cl.
CPC .............. F16D 13/74 (2013.01); F16D 13/72 (2013.01); F16D 25/0638 (2013.01); F16D 55/24 (2013.01); F16D 55/40 (2013.01); F16D 65/18 (2013.01); F16D 65/186 (2013.01); F16D 65/78 (2013.01); F16D 65/853 (2013.01); F16D 2121/04 (2013.01)

(58) Field of Classification Search
None
See application file for complete search history.

(56) References Cited

U.S. PATENT DOCUMENTS 2,869,701 A * 1/1959 Yokel ................. F16D 25/0638
                                                  192/109 F
4,644,968 A    2/1987 Chatterjea
(Continued)

FOREIGN PATENT DOCUMENTS

DE    102010039171 A1    2/2012
JP      S58-53926 U       4/1983
(Continued)

OTHER PUBLICATIONS

German Search Report for German Patent Application No. 10 2017 212 806.2 dated Jun. 20, 2018, 12 pages.

Primary Examiner — Mark A Manley
(74) Attorney, Agent, or Firm — Klintworth & Rozenblat IP LLP (57) ABSTRACT A fluid control assembly controls fluid to a disk pack, which includes a plurality of interleaved disks movable into a disengaged state of the disks, a slip state of the disks and an engaged state of the disks. An actuator assembly is configured to move the disk pack between the disengaged, slip and engaged states. A blocking member is configured to be acted upon by the actuator assembly, such that the actuator assembly and the blocking member: (i) reduce or close off flow of fluid to the disk pack when in the disengaged state, (ii) increase or open flow of fluid to the disk pack when in the slip state, and (iii) reduce or close off flow of fluid to the disk pack when in the engaged state.

16 Claims, 7 Drawing Sheets (51) Int. Cl.
*F16D 65/853* (2006.01)
*F16D 121/04* (2012.01)

(56) References Cited

U.S. PATENT DOCUMENTS

| | | | | |
|---|---|---|---|---|
| 5,224,578 A | * | 7/1993 | Rheinheimer | F16D 25/123 |
| | | | | 192/113.1 |
| 5,613,588 A | * | 3/1997 | Vu | F16D 25/0638 |
| | | | | 188/264 B |
| 6,098,771 A | | 8/2000 | Vu | |
| 6,840,363 B2 | * | 1/2005 | Braford, Jr. | F16D 13/52 |
| | | | | 192/106 F |
| 9,249,873 B2 | * | 2/2016 | Pump | F16H 48/08 |
| 2008/0296115 A1 | | 12/2008 | Biles et al. | |

FOREIGN PATENT DOCUMENTS

| | | |
|---|---|---|
| JP | 2006-300266 A | 11/2006 |
| WO | 02/090790 A1 | 11/2002 |

\* cited by examiner

FLUID CONTROL ARRANGEMENT FOR DISK PACKS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to an arrangement for controlled cooling and/or lubrication of disk packs, such as various brakes and clutches.

BACKGROUND OF THE DISCLOSURE

Transmission assemblies of various kinds for various work vehicles may include gears and associated components arranged to contact a fluid to dissipate heat and ease engagement of mating parts. Cooling is particularly important for certain heat-producing components (e.g., brakes, clutches and the like). Such transmission components (and others) may be configured or located (e.g., nested within other components) such that it may be difficult to adequately deliver the cooling fluid thereto. Cooling arrangements may also realize certain inefficiencies, such as inefficiencies associated with cooling heat-producing components when in non-operational or other states.

SUMMARY OF THE DISCLOSURE

This disclosure provides an arrangement for the controlled cooling and/or lubrication of disk packs, such as various brakes and clutches.

In one aspect the disclosure provides a fluid control assembly for a disk pack including a plurality of interleaved disks movable into a disengaged state of the disks, a slip state of the disks and an engaged state of the disks. An actuator assembly is configured to move the disk pack between the disengaged, slip and engaged states. A blocking member is configured to be acted upon by the actuator assembly, such that the actuator assembly and the blocking member: (i) reduce or close off flow of fluid to the disk pack when in the disengaged state, (ii) increase or open flow of fluid to the disk pack when in the slip state, and (iii) reduce or close off flow of fluid to the disk pack when in the engaged state.

In another aspect the disclosure provides a fluid control assembly for a disk pack including a plurality of interleaved disks movable into a disengaged state of the disks, a slip state of the disks and an engaged state of the disks. A hydraulic piston actuator assembly is configured to move the disk pack between the disengaged, slip and engaged positions. A blocking ring is mounted about the shaft and slidable along shaft by the actuator assembly. The actuator assembly and the blocking ring are configured to: (i) reduce or close off flow of fluid to the disk pack when in the disengaged state, (ii) increase or open flow of fluid to the disk pack when in the slip state, and (iii) reduce or close off flow of fluid to the disk pack when in the engaged state.

In still another aspect the disclosure provides a fluid control assembly for a disk pack including a plurality of interleaved disks movable into a disengaged state of the disks, a slip state of the disks and an engaged state of the disks. An actuator assembly is configured to move the disk pack between the disengaged, slip and engaged positions. The actuator assembly includes a first piston configured to move in a first direction, a first spring configured to move the piston in a direction opposite the first direction, a second piston movable with respect to the first piston, and a second spring configured to resist movement of the second piston in the first direction. A blocking member is configured to be acted upon by the actuator assembly such that the actuator assembly and the blocking member: (i) reduce or close off flow of fluid to the disk pack when in the disengaged state, (ii) increase or open flow of fluid to the disk pack when in the slip state, and (iii) reduce or close off flow of fluid to the disk pack when in the engaged state.

The details of one or more implementations or embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed disk pack fluid control arrangement, as shown in the accompanying figures of the drawings described briefly above. Various modifications to the example embodiments may be contemplated by one of skill in the art.

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, the term "annular" (and derivatives) are used herein to refer to the radial sides or surfaces of an annulus, for example, the outward and inward facing sides or surfaces of an annular body. In the case of an annular body that is symmetric about a central reference axis or centerline, these annular sides and surfaces may correspond with circumferential sides or surfaces thereof, which may also be considered the inner and outer diameter sides or surfaces.

Further, references are made herein to "cooling" and "coolant" with respect to the example fluid control arrangement as applied to cooling a brake/clutch assembly. However, it will be understood that the fluid controlled by the disclosed arrangement may have properties that tend to cool, lubricate, or both, another component, particularly if used to deliver fluid to mating components other than brakes and clutches. Thus, the type of fluid described herein as being delivered to a component is not limiting.

The following describes a fluid control arrangement that is well-suited for use in cooling and/or lubricating mating and heat-generating components that take different states (e.g., active and inactive states) during operation of a machine in which cooling and/or lubricating may be beneficial during one or more states, but unnecessary or inefficient during one or more other states. In this way, the arrangement of this disclosure may be characterized as a "controlled" or "intelligent" system. Yet, the controlled fluid flow provided by the disclosed arrangement occurs without the need for dedicated or shared control hardware programmed to control fluid flow (e.g., by actively controlling one or more control valves). In this way then, the disclosed fluid control arrangement may be properly characterized as a "passive" control system. Aspects of the disclosed fluid control arrangement also make it particularly suitable for cooling and/or lubricating rotating components.

Thus, although applicable for other uses, the disclosed fluid control arrangement may be usefully incorporated into a drivetrain component (e.g., a speed shift transmission assembly) of a work vehicle. The disclosed arrangement may further be useful for delivering fluid (primarily coolant, although the fluid may also have lubricious properties) to disk packs (e.g., brake and clutch packs) used therein, and especially to control fluid flow to the disk packs only during times of engagement in which heat is being generated, or during certain other high-friction or high-heat generation periods. In so doing, the fluid control arrangement may distribute fluid to minimize wear and prolong the operational lifespan of the drivetrain components, as well as improve the efficiency of the system by flowing fluid to the mating and heat-generating components only when necessary or desired.

In certain embodiments, the disclosed fluid control arrangement may use components of the disk pack actuator to aid in controlling the flow of fluid. For example, for a hydraulic piston actuated disk pack, the fluid control arrangement may include a blocking member that is actuated by a main (disk-actuating) piston and may also include a second piston that moves with respect to the main piston. In this case, the actuator assembly and the blocking member may cooperate to close off (or reduce) flow of fluid to the disk pack when in a disengaged state, open (or increase) flow of fluid to the disk pack when in a slip state, and close off (or reduce) flow of fluid to the disk pack when in an engaged state. In this way, the fluid flows to the disk pack exclusively (or primarily) during periods of high heat and friction, and not (or to a lesser extent) when the disk pack is disengaged or while fully engaged.

Figure 1:
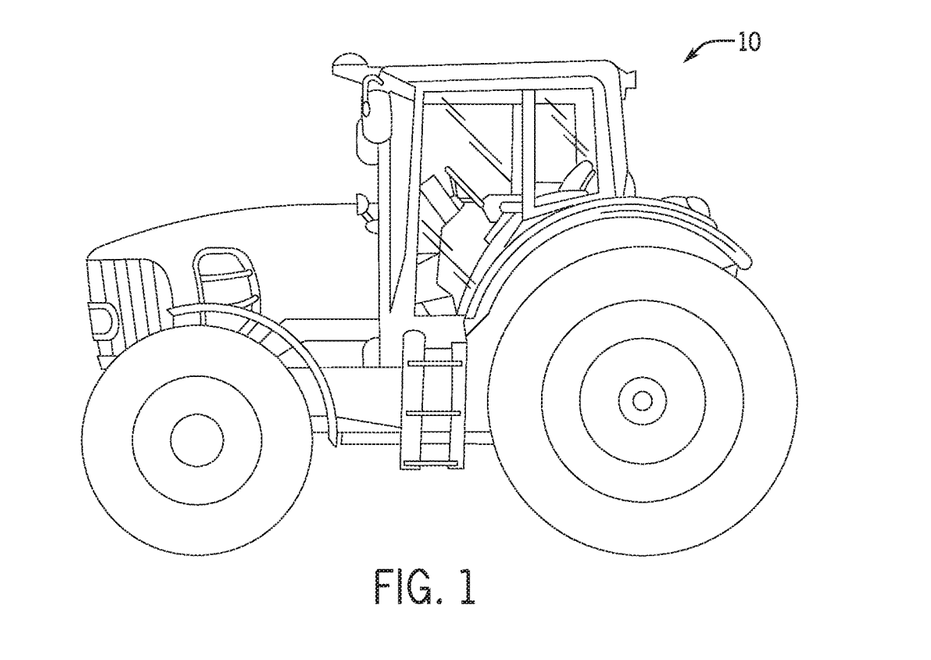
FIG. 1 is a side elevation view of an example work vehicle in the form of an agricultural tractor having an example transmission arrangement as illustrated in accordance with an example embodiment of this disclosure.

Referring now to the drawings, an example embodiment of the disclosure will be described in detail. FIG. 1 shows an example work vehicle 10 in the form of an agricultural tractor containing a driveline in which embodiments of the fluid control arrangement are usefully included. An agricultural tractor is shown by way of contextual example only. It will be appreciated that embodiments of the fluid control arrangement described herein are not restricted to usage in any particular driveline component or type of vehicle or platform, as principles of the disclosed arrangement are applicable to various machines or components with disk packs, including other driveline components (e.g., planetary gear sets and transmissions) used in various vehicles, such as other machines used in the agriculture, construction and forestry industries. Embodiments of the fluid control arrangement may be beneficially utilized within the transmission of a work vehicle, as such transmissions may require relatively robust cooling and lubrication systems. Further, the transmissions of work vehicles may contain certain components (e.g., clutch and brake packs) that are positioned around or otherwise located proximate other internal components (e.g., rotating shafts, drums, planetary gear sets, etc.) that may generate or pick up heat during operation of the transmission, and may have been challenging traditionally to supply with active fluid flow during operation.

Figure 2:
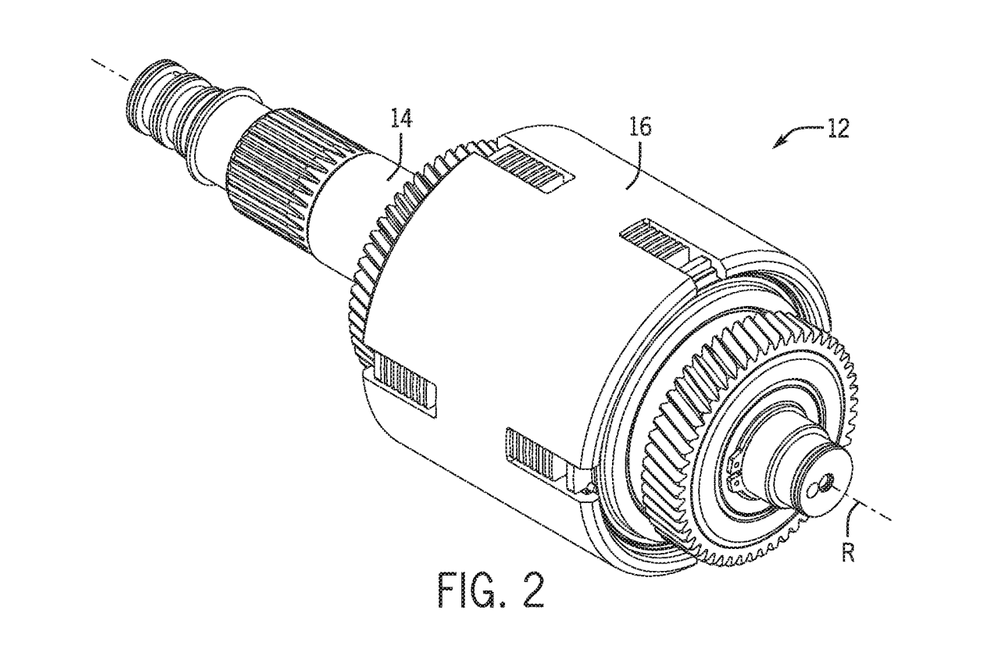
FIG. 2 is a perspective view of the example transmission in the work vehicle of FIG. 1.
Figure 3:
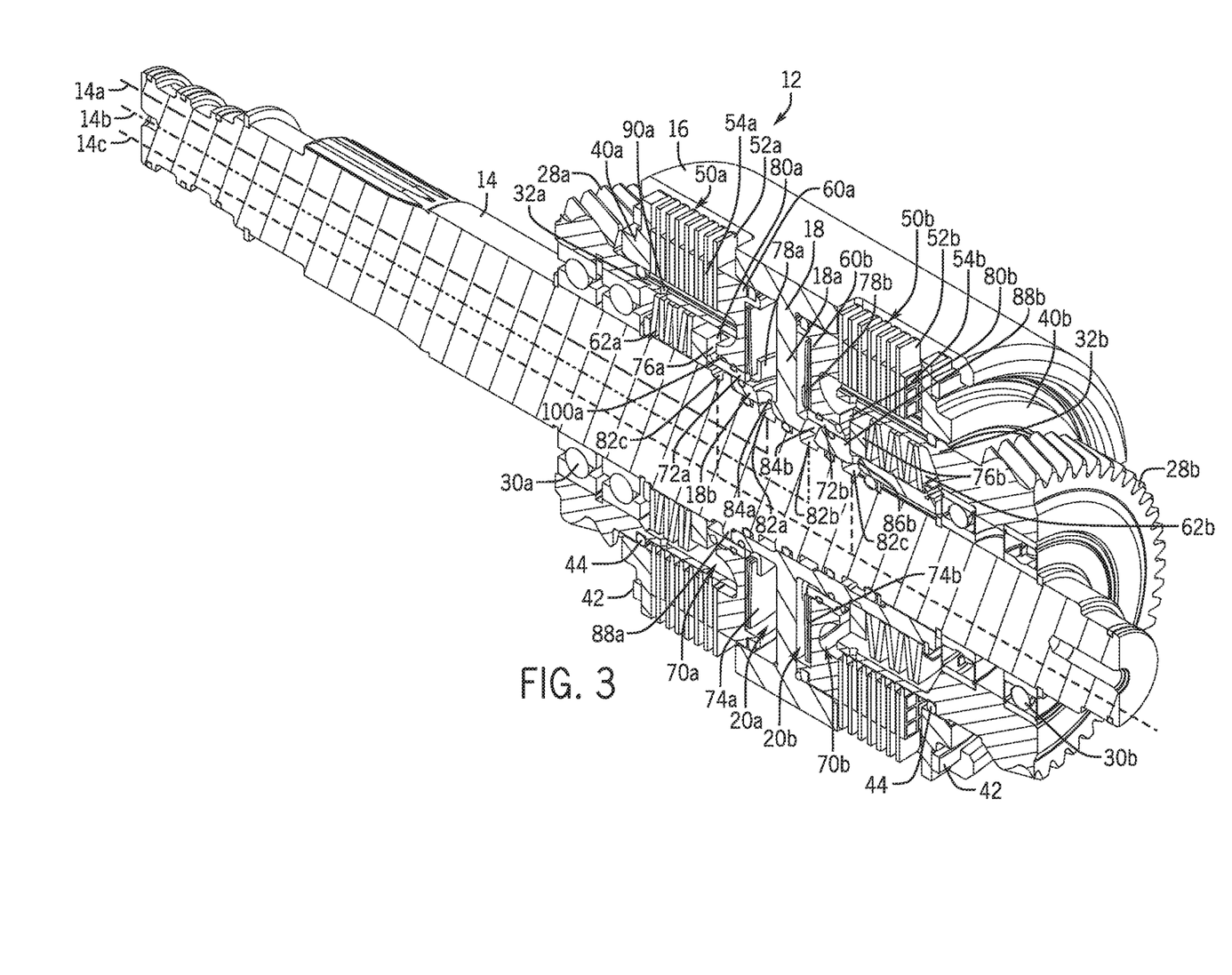
FIG. 3 is a perspective cross-sectional view of the example transmission as taken along line 3-3 of FIG. 2, showing an example fluid control arrangement according to this disclosure.
Figure 4:
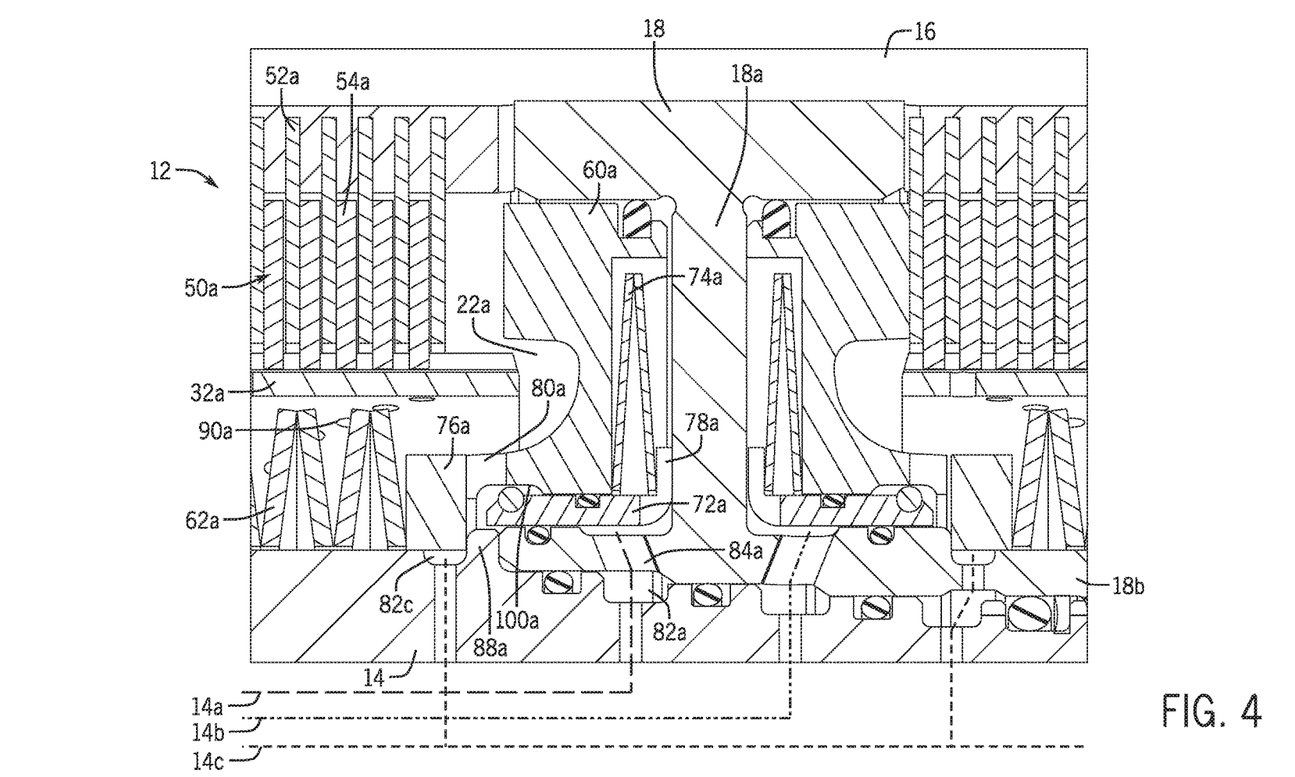
FIG. 4 is an enlarged cross-sectional detail view of the area 4-4 of FIG. 3.

FIGS. 2 and 3 show an example transmission unit 12 that may be included in the work vehicle 10. The transmission unit 12 shown is merely an example, as the particular type, construction, and functionality of the work vehicle transmission is largely incidental and will only be described briefly herein. As will be understood, the transmission unit 12 may be part of the work vehicle's drivetrain and be operably coupled to hydraulic and electronic control systems thereof to effect changes in the gear ratio between the engine and drive wheels of the work vehicle 10. Generally, the transmission unit 12 includes a drive shaft 14 extending concentrically along a rotation axis "R." The drive shaft 14 may have various internal passages (e.g., hydraulic pressure supply passages 14a, 14b and fluid supply passages 14c) extending in axial, radial or other directions (and associated circumferential grooves or channels) through which various fluids (e.g., hydraulic oil, coolant, lubricant, etc.) may be introduced into the transmission unit 12 from a corresponding supply pump or tank (not shown). In the illustrated example, an axial segment of the drive shaft 14 is surrounded by a housing 16. The housing 16 may be generally cylindrical and include a central partition 18 that includes a radial wall 18a and a central hub 18b, which is open-ended and extends concentrically along the rotation axis R to opposite sides of the radial wall 18a. The partition 18 divides the housing 16 into two internal chambers 20*a*, 20*b* that are open at outer axial ends of the housing 16. Output gears 28*a*, 28*b*, which may be any suitable type of internal or external gear (e.g., spur, bevel, rack and pinion, etc.), including the external helical gears shown, may be mounted to the drive shaft 14 at the open ends of the housing 16 by one or more rolling element bearings, such as the depicted pairs of ball bearings 30*a*, 30*b*, which permit the gears 28*a*, 28*b* to mount and rotate relative to the drive shaft 14. The gears 28*a*, 28*b* have hubs 32*a*, 32*b*, which extend axially into the chambers 20*a*, 20*b* of the housing 16. The hubs 32*a*, 32*b* and end plates 40*a*, 40*b* cooperate to close off the ends of the housing 16. Various seals, such as ring seals 42 and O-rings 44, may be fit between (in associated grooves and so on) the end plates 40*a*, 40*b* and the housing 16 and the hubs 32*a*, 32*b* to fluidly seal the ends of the housing 16.

The hubs 32*a*, 32*b* may be outwardly axially splined at or near their axially inner ends. The hubs 32*a*, 32*b* may be splined to disk packs 50*a*, 50*b*, which may serve as brake packs for the gears 28*a*, 28*b*, the alternate selection of which may in turn provide a change in gear ratio (e.g., relatively low and high ranges) of the transmission unit 12. It should be understood that in other arrangements, the disk packs 50*a*, 50*b* may be controlled to operate as clutches rather than brakes, and that the construction of the disk packs 50*a*, 50*b* may vary amongst embodiments. By way of example, the disk packs 50*a*, 50*b* may each include interleaved disks, such as separator plates 52*a*, 52*b*, which are fixed or splined to the housing 16 at their outer peripheries, and friction disks 54*a*, 54*b*, which are interleaved with the separator plates 52*a*, 52*b* and splined to the hubs 32*a*, 32*b* at their inner peripheries. The friction disks 54*a*, 54*b* may be monolithic or composite structures having friction-enhancing features that are attached to (e.g., adhered, embedded, coated, fixed with mechanical fasteners, etc.) or formed into (e.g., etched, machined, molded, cast, etc.) into a structural backing component thereof. The inner peripheries of the friction disks 54*a*, 54*b* may be notched to match, and thereby interfit and engage with, the splined sections of the hubs 32*a*, 32*b*. The disk packs 50*a*, 50*b* may also include springs (not shown) arranged to bias the separator plates 52*a*, 52*b* and the friction disks 54*a*, 54*b* toward a non-contacting position in a "force-separated" arrangement. For example, one or more large-diameter springs (e.g., wave or Belleville type springs) may be set within the annular gaps or channels extending about the radially outer periphery of the friction disks 54*a*, 54*b*. The disk packs 50*a*, 50*b* may be joined in a stacked configuration by a number of fasteners (not shown) (e.g., pins, rods, dowels, bolts, etc.), as needed. During operation of the transmission unit 12, hydraulically-actuated annular pistons 60*a*, 60*b*, as described below, may be applied alternatively to selectively exert an axially-compressive force across one of the disk packs 50*a*, 50*b* to slow or stop the rotation of its friction disks 54*a*, 54*b* and, thereby, the rotation of the associated gear 28*a*, 28*b* relative to the drive shaft 14. The non-braked gear 28*a*, 28*b* will rotate with the drive shaft 14 and transfer power according to the gear ratio provided by its sizing (e.g., tooth count).

The disk packs 50*a*, 50*b* may generate a considerable amount of heat when utilized to brake (or alternatively to clutch) the transmission unit 12. Particularly during periods of relative contacting rotation between the separator plates 52*a*, 52*b* and the rapidly rotating friction disks 54*a*, 54*b* of the disk packs 50*a*, 50*b* excessive heat may be generated due to friction. It is thus desirable to dissipate heat by contacting the disk packs 50*a*, 50*b* with an active flow of liquid, such as a suitable oil. However, due to the relatively tight packaging of the transmission unit 12, it may be difficult or impractical to deliver sufficient flow to the interior of the disk packs 50*a*, 50*b* to cool them adequately and to do so for a duration that is both adequate and efficient.

The disclosed fluid control arrangement will now be described in the context of the transmission unit 12 that promotes efficient cooling of the disk packs 50*a*, 50*b*. By virtue of this design, the disk packs 50*a*, 50*b* will be cooled primarily (via increased flow) or exclusively during the period(s) of time or active state(s) in which the most heat is being generated. At one or more other times or states, the disk packs 50*a*, 50*b* will either be cut off from the fluid flow or subjected to a reduced flow. Cooling the disk packs 50*a*, 50*b* at the critical times/states aids in prolonging the serviceable lifespan of the disk packs 50*a*, 50*b*, and thus of the transmission unit 12. Efficiently managing the fluid flow avoids using system resources to flow fluid to the disk packs 50*a*, 50*b* unnecessarily that could otherwise be used to cool other components and reduces drag and other friction or pressure losses resulting from the disk packs 50*a*, 50*b* being rotated and/or moved through viscous fluids. Moreover, the efficiency the fluid control arrangement may be further enhanced by, as is the case in the illustrated example, delivering the fluid flow to the inner peripheries of the disk packs 50*a*, 50*b* such that the fluid may be carried through the disk packs 50*a*, 50*b* in a radially outward direction by centrifugal force, rather than requiring active pressurization of the fluid (although pressurized fluid may indeed be used).

Figure 6A:
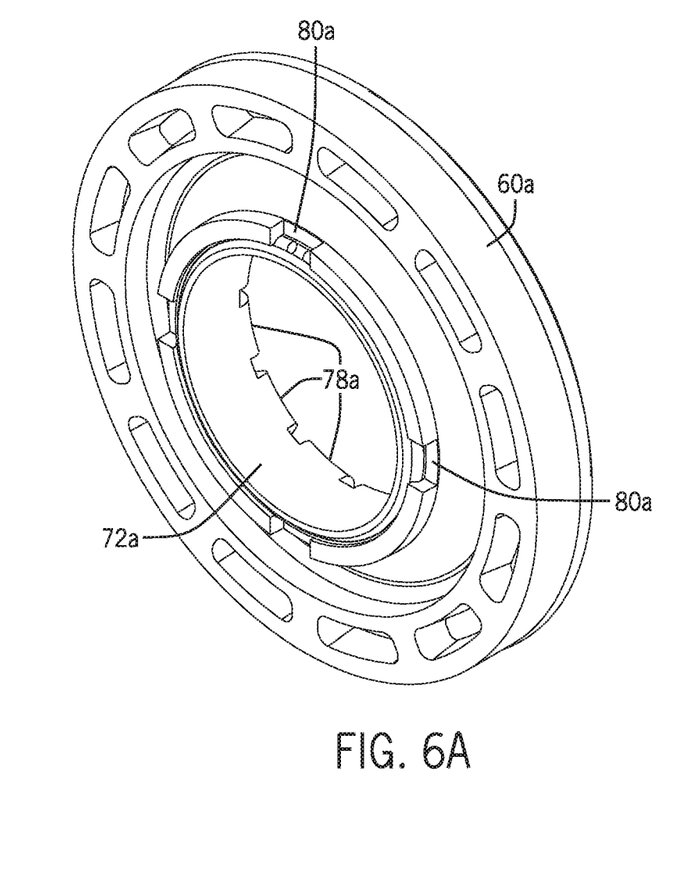
FIGS. 6A and 6B are opposite side perspective views of a nested piston arrangement for the example fluid control arrangement.
Figure 6B:
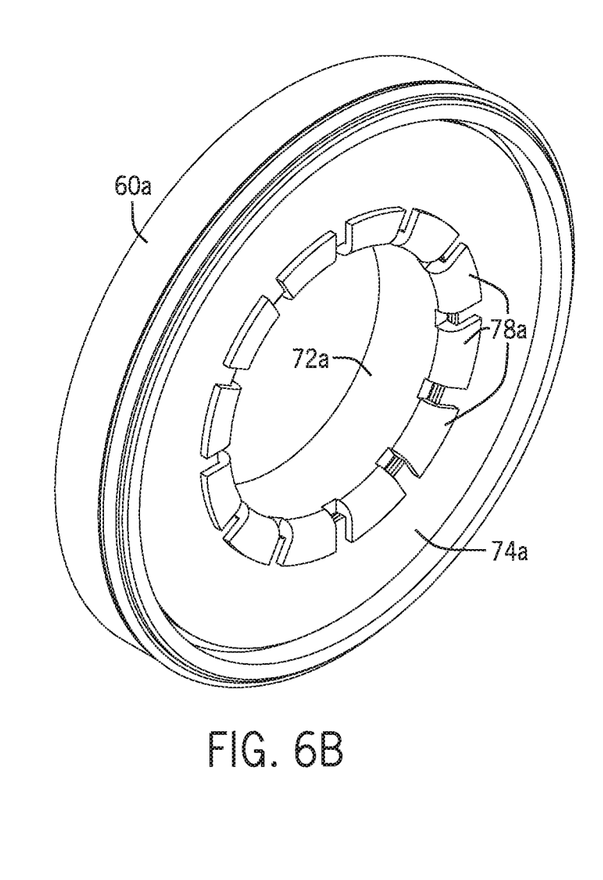

The example fluid control arrangements 70*a*, 70*b* work in conjunction with, or may be thought of to include, the main pistons 60*a*, 60*b* that actuate the disk packs 50*a*, 50*b* to move against and overcome the force of return springs 62*a*, 62*b*, which bias the main pistons 60*a*, 60*b* away from the disk packs 50*a*, 50*b*. The fluid control arrangements 70*a*, 70*b* also include secondary pistons 72*a*, 72*b* and associated secondary springs 74*a*, 74*b* as well as blocking members 76*a*, 76*b*. As shown in FIGS. 6A and 6B, the main pistons 60*a*, 60*b* may form a sub-assembly with the secondary pistons 72*a*, 72*b* and the springs 74*a*, 74*b* (and associated seals). As shown, the secondary pistons 72*a*, 72*b* may be annular rings with a plurality of bent over tabs 78*a*, 78*b* that capture the springs 74*a*, 74*b* within pressure cavities formed between axial ends of the main pistons 60*a*, 60*b* and the secondary pistons 72*a*, 72*b*. Instead of tabs, the secondary pistons 72*a*, 72*b* may each have a single rolled ring or various other configurations. Moreover, the main pistons 60*a*, 60*b* may be configured with one or more openings, such as four angularly-spaced notches 80*a*, 80*b*, which allow for fluid flow, as described below.

Figure 5A:
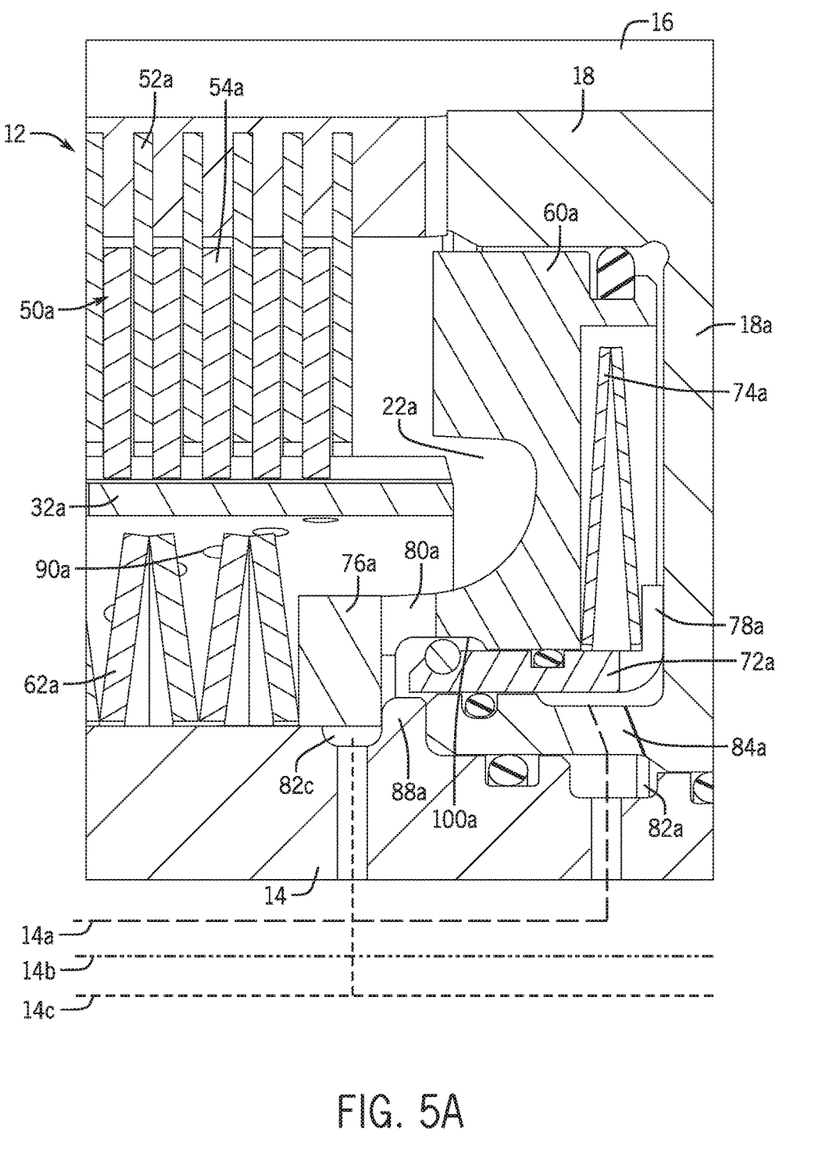
FIGS. 5A-5C are further enlarged cross-sectional detail views thereof showing a fluid control arrangement when an associated disk pack is in disengaged, slip and engaged states, respectively.
Figure 5B:
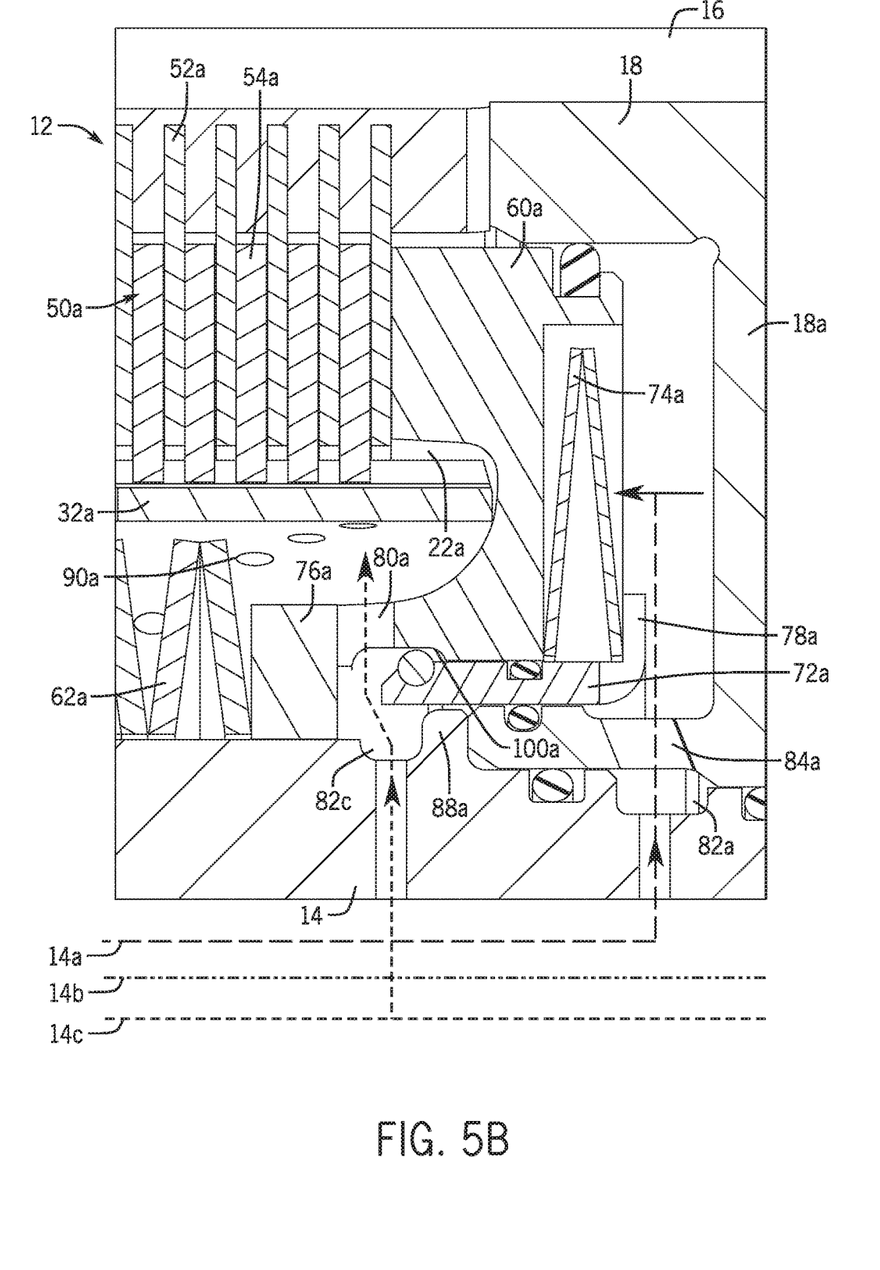
Figure 5C:
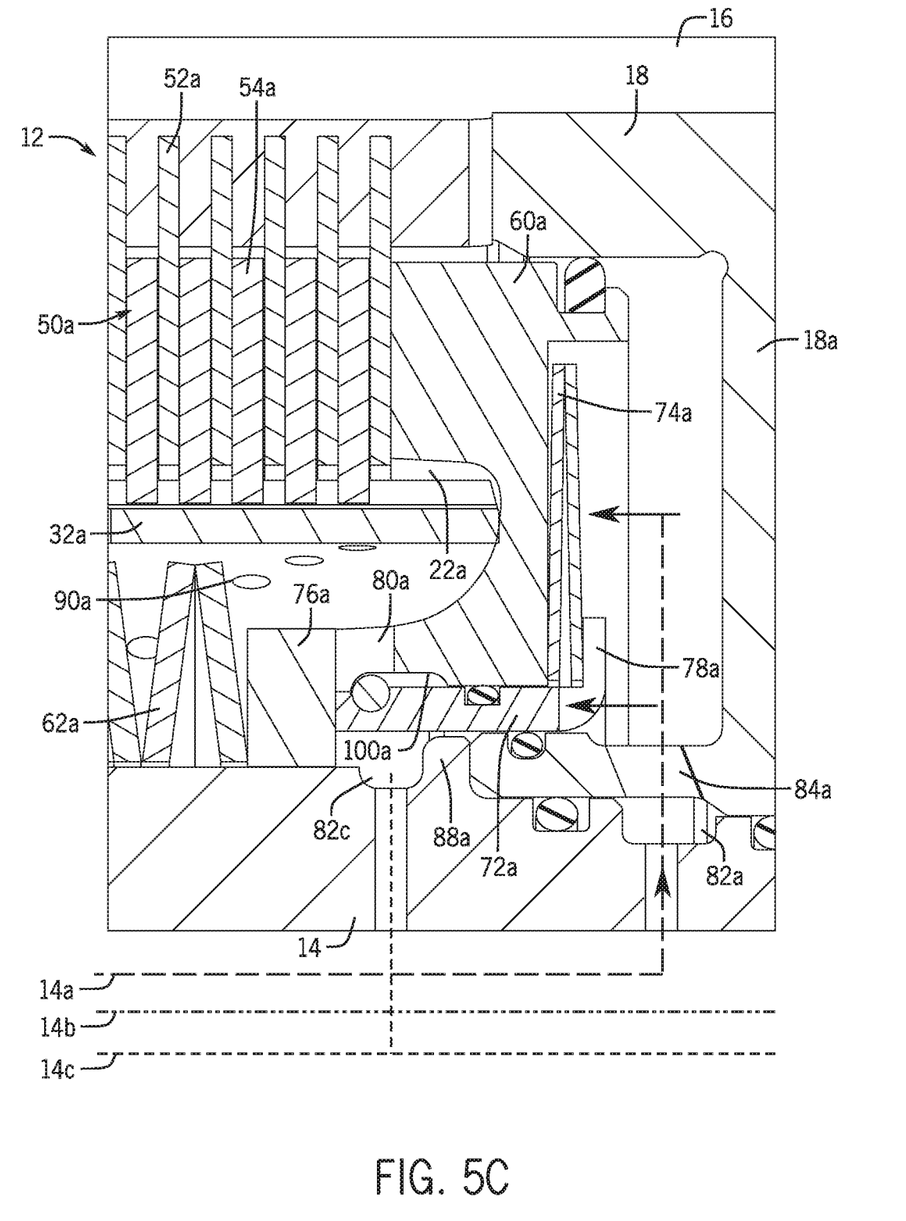

In the illustrated example, the disk packs 50*a*, 50*b* can be considered to operate in one of three states, to wit, a disengaged state such as the position of disk pack 50*a* shown in FIG. 5A, an intermediate, partially engaged "slip" state such as in the position of disk pack 50*b* shown in FIG. 5B, and a fully engaged state such as in the position shown in FIG. 5C. Although not shown, it will be understood that the disk pack 50*b* may operate in similar states. The states of the disk packs 50*a*, 50*b* are controlled based upon the supply of hydraulic pressure to the main pistons 60*a*, 60*b*. Hydraulic pressure is provided by the vehicle hydraulic system, with its associated pump(s) and valves, to flow through the pressure supply passages 14*a*, 14*b* of the drive shaft 14. In the illustrated example, radial legs of the pressure supply passages 14*a*, 14*b* bring the hydraulic fluid to circumferential grooves 82*a*, 82*b*, which in turn communicate the hydraulic fluid to cavities containing the main pistons 60*a*, 60*b* via ports 84*a*, 84*b* in the central hub 18*b* of the housing partition 18. As shown, the flow path for the hydraulic fluid is sealed by various seals and O-rings disposed in associated grooves in the drive shaft 14, the central hub 18b and the main 60a, 60b and secondary 72a, 72b pistons. Fluid flows from the fluid supply passage 14c into a circumferential groove 82c in the drive shaft 14 for each of the fluid control arrangements 70a, 70b.

The control of the main pistons 60a, 60b is the only external input needed to effect efficient management of the fluid based on the operational states of the disk packs 50a, 50b according to this disclosure. Opening the disk packs 50a, 50b to the fluid (or increasing flow thereto) and closing off (or reducing) fluid flow to the disk packs 50a, 50b happens "automatically" by mechanical operation of the fluid control arrangement 70a, 70b (especially pistons 72a, 72b and springs 74a, 74b) in response to actuation of the main pistons 60a, 60b. The fluid control arrangements 70a, 70b operate to move the secondary pistons 72a, 72b to control flow of cooling fluid from the fluid supply passage 14c, as described below.

During operation of the transmission unit 12, the main pistons 60a, 60b are controlled (via control of hydraulic pressure) to alternatively engage disk pack 50a and disengage disk pack 50b or disengage disk pack 50a and engage disk pack 50b. While in the illustrated embodiment the disk packs 50a, 50b operate in alternate states, it is also possible for the transmission unit 12 to be configured to operate with both disk packs 50a, 50b simultaneously in either a disengaged state or an engaged state. In the illustrated example, the former brakes disk pack 50a so that it does not rotate with the drive shaft 14, and thereby permits rotational power (or torque) to flow only through the gear 28b. The latter brakes the disk pack 50b so that it does not rotate with the drive shaft 14, and thereby permits rotational power (or torque) to flow only through the gear 28a. The gear ratio of the transmission unit 12 thus changes based on the size (e.g., diameter, tooth count, etc.) of the gear 28a, 28b through which power flows. It should be noted that in certain configurations the transmission unit 12 may be configured so that both disk packs 50a, 50b are simultaneously engaged or disengaged.

As noted, the fluid control arrangements 70a, 70b are configured to passively control the flow of fluid to the disk packs 50a, 50b in response to movement of the main pistons 60a, 60b. Specifically, FIG. 5A depicts the fluid control arrangement 70a when the disk pack 50a is disengaged from the main pistons 60a. In this disengaged state, the disk pack 50a is not generating heat, since the friction disks 54a rotating with the drive shaft 14 are not engaging the stationary separator plates 52a. However, because of this, presence of fluid (which is more viscous than air) may contribute to certain frictional or inertial losses that make the system run less efficiently. In the disengaged state, hydraulic pressure to the main piston 60a is relieved, and the return spring 62a forces the blocking ring 76a into axial positions in which the blocking ring 76a aligns with the radial leg of the fluid supply passage 14c and the groove 82c. It should be noted that in the case of the disk pack 50b, an intermediate port 86b in the central hub 18b of the partition 18 conveys flow from the fluid supply passage 14c, which may be in an axial position that is radially offset from the associated radial leg of the fluid supply passage 14c, in which case the blocking ring 76b is positioned to align with, and close off (or reduce) flow from, the port 86b. Annular back stops 88a, 88b, projecting radially outward from the drive shaft 14 and central hub 18b, respectively, provide positive stops against which the blocking rings 76a, 76b seat when in the disengaged states of the disk packs 50a, 50b. In the illustrated example, when the blocking rings 76a, 76b are in these positions they completely close off flow from the fluid supply passage 14c into the chambers 20a, 20b. However, as mentioned, the fluid control arrangements 70a, 70b may be configured so that some reduced volume of flow is permitted to pass from the fluid supply passage 14c into the chambers 20a, 20b and to the disk packs 50a, 50b, for example, by perforating the blocking rings or positioning the blocking rings into axial positions that are slightly radially offset from the radial legs of the fluid supply passage 14c (or port 86b). In the disengaged state, the return springs 62a, 62b (via contact with the block rings 76a, 76b) overcome the springs 74a, 74b to retract the main pistons 60a, 60b, and also retract the secondary pistons 72a, 72b (via the springs 74a, 74b).

Re-opening hydraulic pressure to one of the main pistons 60a, 60b via the pressure supply passages 14a, 14b begins to engage the disk packs 50a, 50b, which enter a "slip" state in which power (or torque) begins to flow from the drive shaft 14 to one of the gears 28a, 28b. In this partial or intermediate state of engagement, the frictional forces between the mating separator plates 52a, 52b and friction disks 54a, 54b are not fully applied or developed such that they may be overcome temporarily by downstream forces (e.g., inertia, friction, etc.) resisting rotation causing relative "slip" between the mating components. This slip or relative movement contributes to the greatest generation of heat in the disk packs 50a, 50b such that cooling during this slip state is most beneficial.

As shown in FIG. 5B, the hydraulic pressure is applied to the main piston 60a via pressure supply passage 14a, which moves the main piston 60a axially (to the left in FIG. 5B) against the return spring 62a (via contact with the blocking ring 76a) to engage the disk pack 50a. The secondary spring 74a temporarily resists or initially delays axial movement of the secondary piston 72a by its spring force working (to the left in FIG. 5B) to axially space apart the pistons. As shown, the main piston 60a unseats the blocking ring 76a and the delay in movement of the secondary piston 72a permits flow from the radial leg of the fluid supply passage 14c and the groove 82c to pass into the chamber 20a. Cooling fluid can then flow radially outward through the notches 80a in the main piston 60a and from there through openings 90a in the hub 32a to cool the disk pack 50a. As shown, the groove 100a is sized larger in the axial dimension than a corresponding snap ring disposed therein so that the snap ring can move axially within the groove 100a as the secondary piston 72a moves. This serves to allow a seal (e.g., an O-ring), which is disposed in a corresponding groove in one of the pistons (e.g., the secondary piston 72a), to move (slide) axially within a limited range to maintain a dynamic seal (of the hydraulic pressure chamber) during the relative movement of the main piston 60a with respect to the secondary piston 72a.

As hydraulic pressure continues to build it continues to force the main piston 60a against the disk pack 50a to fully engage its separator plates 52a and friction disks 54a, as shown in FIG. 5C. The hydraulic pressure also overcomes the spring force of the spring 74a and moves the secondary piston 72a axially (to the left in FIG. 5C). In this orientation, the secondary piston 72a cooperates with, and in the example configuration physically contacts, the blocking ring 76a, to close off the chamber 20a from the fluid supply passage 14c (and groove 82c). Again, it should be noted that the arrangement could be configured to reduce, rather than completely shut off, the fluid flow. Since the disk pack 50a is now in a fully engaged state, the inter-disk pack frictional forces and the hydraulic pressure significantly reduce or eliminate the occurrence of slip, and thus the generation of heat associated with relative movement of the rotating components, such that cooling the disk pack 50a is less critical, and may be reduced or stopped entirely to allow the system to operate more efficiently.

There have thus been described embodiments of a fluid control arrangement, which may be advantageously utilized to cool or lubricate disk packs of various components, such as various driveline components of work vehicles. The fluid control arrangement may include nested concentric pistons, including a primary piston for actuating the disk pack, that controls the flow of fluid in an efficient, passive manner that improves the operational life of the disk packs and associated components as well as the overall operability thereof. The nested piston arrangement ensures that fluid flow is present (or increased) when the disk pack is operating in its primary heat-producing state, and cut off (or reduced) when inactive or otherwise in a lesser heat-producing state. Embodiments of the fluid control arrangement allow for fluid flow to be directed to the disk pack during "slipping" as the disk pack transitions between fully engaged and disengaged states and reduced or cut off from the disk pack when it the disks are disengaged. Embodiments of the fluid control arrangement also allow for the fluid flow to be cut off (or reduced) when the disk pack is fully engaged, which, while still in an active state, may produce significantly less heat than when in the slip state, so that cooling the disk pack would be unnecessary and inefficient.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). For example, as noted above, although the example described herein pertains to cooling disk packs in transmission units, the principles of the disclosure may be employed to control fluid other types of fluid than coolants and lubricants in other types of components.

Additionally, this disclosure describes example embodiments in which the disk packs function as brakes, however, it will be recognized to one of skill in the art that the disk packs could instead function as clutches in which when the disk packs are engaged they are used to transfer rotational power rather than stop rotation.

Accordingly, various implementations other than those explicitly described are within the scope of the claims.

What is claimed is:

1. A fluid control assembly for a disk pack including a plurality of interleaved disks movable into a disengaged state of the disks, a slip state of the disks and an engaged state of the disks, the fluid control assembly comprising:
    an actuator assembly configured to move the disk pack between the disengaged, slip and engaged states, the actuator assembly including a first piston configured to move in a first direction, a first spring configured to move the first piston in a direction opposite the first direction, a second piston movable with respect to the first piston, and a second spring configured to resist movement of the second piston in the first direction;
    a blocking member configured to be acted upon by the actuator assembly to:
        one of reduce and close off flow of fluid to the disk pack when in the disengaged state;
        one of increase and open flow of fluid to the disk pack when in the slip state; and
        one of reduce and close off flow of fluid to the disk pack when in the engaged state; and
    a rotatable shaft drive member that has a fluid passage extending radially through the drive member to an annular groove;
    wherein the blocking member is a ring having an inner diameter slidable along the drive member to at least partially close off the fluid passage by the inner diameter at least partially overlapping the annular groove of the drive member when the disk pack is in the disengaged and engaged states.

2. The assembly of claim 1, wherein the blocking member is arranged to close off the fluid passage when the disk pack is in the disengaged state.

3. The assembly of claim 2, wherein, when the disk pack is in the slip state, the blocking member is arranged to open the fluid passage to an opening in the first piston of the actuator assembly.

4. The assembly of claim 3, wherein, when the disk pack is in the engaged state and the blocking member is arranged to open the fluid passage to the opening in the first piston of the actuator assembly, the second piston of the actuator assembly is arranged to interrupt flow from the fluid passage to the opening in the first piston.

5. The assembly of claim 2, wherein the drive member is a rotatable shaft and the blocking member is a ring disposed about and slidable along the shaft.

6. The assembly of claim 1, wherein the actuator assembly is hydraulically actuated to move the disk pack into the engaged state.

7. The assembly of claim 1, wherein the first piston engages the disk pack and the blocking member;
    wherein the first piston moves in the first direction against the first spring to move the disk pack from the disengaged state to the slip state and to unseat the blocking member from a fluid passage through which fluid flows to a flow port in the first piston; and
    wherein the second spring resists movement of the second piston in the first direction when the disk pack is in the slip state.

8. The assembly of claim 7, wherein the first piston moves in the first direction to move the disk pack from the slip state to the engaged state; and wherein the second piston moves in the first direction against the second spring to interrupt flow from the fluid passage to the flow port in the first piston.

9. The assembly of claim 8, wherein the first and second pistons are annular members disposed about and slidable along the shaft.

10. The assembly of claim 9, wherein the second piston is nested radially within the first piston; and wherein the second spring is disposed in a cavity radially between the first and second pistons.

11. The assembly of claim 10, wherein the cavity is a pressure cavity for hydraulic fluid to move the first and second pistons in the first direction.

12. A fluid control assembly for a disk pack including a plurality of interleaved disks movable into a disengaged state of the disks, a slip state of the disks and an engaged state of the disks, the fluid control assembly comprising:

a hydraulic piston actuator assembly configured to move the disk pack between the disengaged, slip and engaged states;

a blocking ring mounted about a shaft rotating at least some of the disks of the disk pack, the shaft having a fluid passage extending radially through the shaft to an annular groove, and the blocking ring having an inner diameter slidable along the shaft by the actuator assembly;

wherein the actuator assembly and the blocking ring are configured to:

one of reduce and close off flow of fluid to the disk pack when in the disengaged state;

one of increase and open flow of fluid to the disk pack when in the slip state; and one of reduce and close off flow of fluid to the disk pack when in the engaged state;

wherein the blocking ring at least partially closes off the fluid passage by the inner diameter at least partially overlapping the annular groove of the shaft when the disk pack is in the disengaged and engaged states;

wherein the blocking ring is arranged to close off the fluid passage when the disk pack is in the disengaged state;

wherein, when the disk pack is in the slip state, the blocking ring is arranged to open the fluid passage to an opening in a first piston of the actuator assembly and, when the disk pack is in the engaged state and the blocking ring is arranged to open the fluid passage to the opening in the first piston of the actuator assembly, a second piston of the actuator assembly is arranged to interrupt flow from the fluid passage to the opening in the first piston.

13. A fluid control assembly for a disk pack including a plurality of interleaved disks movable into a disengaged state of the disks, a slip state of the disks and an engaged state of the disks, the fluid control assembly comprising:

an actuator assembly configured to move the disk pack between the disengaged, slip and engaged states, the actuator assembly including:

a first piston configured to move in a first direction;

a first spring configured to move the piston in a direction opposite the first direction;

a second piston movable with respect to the first piston; and a second spring configured to resist movement of the second piston in the first direction; and a blocking member configured to be acted upon by the actuator assembly, the blocking member being a ring mounted about a shaft rotating at least some of the disks of the disk pack, the shaft having a fluid passage extending radially through the shaft to an annular groove, and the blocking ring having an inner diameter slidable along the shaft by the actuator assembly;

wherein the actuator assembly and the blocking member are configured to:

one of reduce and close off flow of fluid to the disk pack when in the disengaged state;

one of increase and open flow of fluid to the disk pack when in the slip state; and one of reduce and close off flow of fluid to the disk pack when in the engaged state;

wherein the blocking member at least partially closes off the fluid passage by the inner diameter at least partially overlapping the annular groove of the shaft when the disk pack is in the disengaged and engaged states;

wherein the first piston engages the disk pack and the blocking member;

wherein the first piston moves in the first direction against the first spring to move the disk pack from the disengaged state to the slip state and to unseat the blocking member from a fluid passage through which fluid flows to a flow port in the first piston; and wherein the second spring resists movement of the second piston in the first direction when the disk pack is in the slip state.

14. The assembly of claim 13, wherein the first piston moves in the first direction to move the disk pack from the slip state to the engaged state; and wherein the second piston moves in the first direction against the second spring to interrupt flow from the fluid passage to the flow port in the first piston.

15. The assembly of claim 14, wherein the second piston is nested radially within the first piston; and wherein the second spring is disposed in a cavity radially between the first and second pistons.

16. The assembly of claim 15, wherein the cavity is a pressure cavity for hydraulic fluid to move the first and second pistons in the first direction.

* * * * *

UNITED STATES PATENT AND TRADEMARK OFFICE
CERTIFICATE OF CORRECTION

PATENT NO. : 10,288,129 B2
APPLICATION NO. : 15/249983
DATED : May 14, 2019
INVENTOR(S) : Long et al.

Page 1 of 1

It is certified that error appears in the above-identified patent and that said Letters Patent is hereby corrected as shown below:

In the Claims

In Column 10, Claim 7, Line 63, delete "a fluid passage" and insert -- the fluid passage --, therefor.

Signed and Sealed this
Nineteenth Day of November, 2019

Andrei Iancu
*Director of the United States Patent and Trademark Office*